(12) United States Patent
Kline et al.

(10) Patent No.: US 9,992,444 B2
(45) Date of Patent: Jun. 5, 2018

(54) SYSTEM AND METHOD FOR PREVENTING UNAUTHORIZED RECORDING, RETRANSMISSION AND MISUSE OF AUDIO AND VIDEO

(71) Applicant: Pegasus Media Security, LLC, Reston, VA (US)

(72) Inventors: Paul A. Kline, Washington, DC (US); Gil Kline, Washington, DC (US); Allan Weinstein, Potomac, MD (US); David J. Weinstein, Arlington, VA (US)

(73) Assignee: Pegasus Media Security, LLC, Reston, VA (US)

( * ) Notice: Subject to any disclaimer, the term of this patent is extended or adjusted under 35 U.S.C. 154(b) by 0 days. days.

(21) Appl. No.: 15/248,616

(22) Filed: Aug. 26, 2016

(65) Prior Publication Data

US 2017/0064246 A1  Mar. 2, 2017

Related U.S. Application Data

(60) Provisional application No. 62/211,617, filed on Aug. 28, 2015.

(51) Int. Cl.
| | |
|---|---|
| *H04N 9/80* | (2006.01) |
| *H04N 5/913* | (2006.01) |
| *G11B 20/00* | (2006.01) |
| *G10L 19/018* | (2013.01) |

(Continued)

(52) U.S. Cl.
CPC .......... *H04N 5/913* (2013.01); *G10L 19/018* (2013.01); *G11B 20/00884* (2013.01); *H04N 9/802* (2013.01); *H04N 2005/91307* (2013.01)

(58) Field of Classification Search
USPC ........ 386/255, 257, 252, 248, 239; 380/201, 380/203, 236, 237, 238, 239
See application file for complete search history.

(56) References Cited

U.S. PATENT DOCUMENTS

| 4,644,422 A | 2/1987 | Bedini |
| 5,970,156 A * | 10/1999 | Hummelgaard ........ G10L 25/78 381/94.2 |

(Continued)

OTHER PUBLICATIONS

International Search Report and Written Opinion for International Application No. PCT/US2016/049040, dated Dec. 1, 2016.

*Primary Examiner* — Daquan Zhao
(74) *Attorney, Agent, or Firm* — Cooley LLP

(57) ABSTRACT

In some embodiments, a method includes receiving, at a device, digital audio content to be converted by a digital-to-analog converter to produce analog audio content. The digital audio content has at least one audible frequency. The method also includes selecting, at the device, a first signal and a second signal to output with the analog audio content. The first signal has an inaudible carrier frequency and a bandwidth, and the second signal also has an inaudible carrier frequency and a bandwidth. A difference between the first signal and the second signal is an undesired audible signal. The method further includes outputting, from the device, the analog audio content, the first signal and the second signal, such that when the analog audio content is detected by a recording device the undesired audible signal is detected with the analog audio content.

26 Claims, 10 Drawing Sheets

(51) Int. Cl.
*H04N 9/802* (2006.01)
*H04N 7/167* (2011.01)

(56) References Cited

U.S. PATENT DOCUMENTS

| 6,904,153 | B1 * | 6/2005 | Wijnen | G11B 20/00086 |
| | | | | 360/60 |
| 2007/0185813 | A1 | 8/2007 | Shear et al. | |
| 2007/0192091 | A1 | 8/2007 | DeCegama | |
| 2007/0287380 | A1 * | 12/2007 | Hui | H04R 5/033 |
| | | | | 455/41.1 |

* cited by examiner

Jamming Signal: a strong audible signal that is the difference between the multiple inaudible high frequency signals that can be heard when the desired audio is sampled/ rerecorded.

Jamming Signal = Greater than ½ the sample rate of the desired audio signal.

The Jamming Signal can be anything, e.g., a sin wave, noise, speech (signal could say: this file is copyrighted), or an inversion of the desired audio signal.
Please refer to the subsequent diagram below:

In Air: (FIG. 7A)
*Note:*
*SR = Sample Rate*
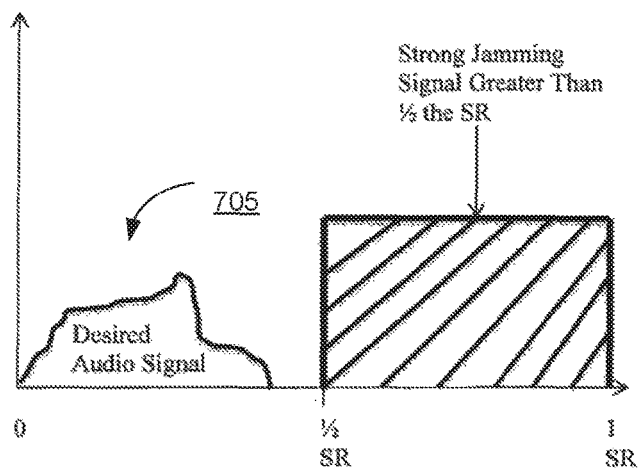
After Sampled (I.E Recorded): (FIG. 7B)
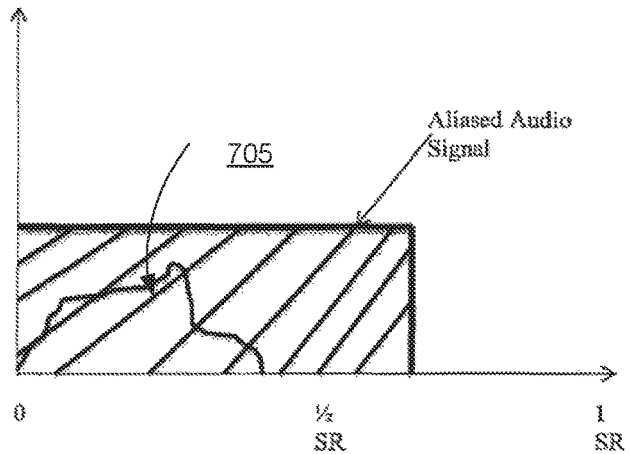
Inversion:
Take audio and invert phase 180° using Laplace transform. This would null the density signal when sampled (recorded).

900

902  Receiving, at a device, digital audio content to be converted by a digital-to-analog converter to produce analog audio content, the digital audio content having at least one audible frequency.

904  Selecting, at the device, a first signal and a second signal to output with the analog audio content, the first signal having an inaudible carrier frequency and a bandwidth, the second signal having an inaudible carrier frequency and a bandwidth, a difference between the first signal and the second signal being an undesired audible signal.

906  Outputting, from the device, (1) the analog audio content, (2) the first signal and (3) the second signal, such that when the analog audio content is detected by a recording device the undesired audible signal is detected with the analog audio content.

FIG. 9

SYSTEM AND METHOD FOR PREVENTING UNAUTHORIZED RECORDING, RETRANSMISSION AND MISUSE OF AUDIO AND VIDEO

CROSS-REFERENCE TO RELATED APPLICATIONS

The application claims priority to provisional application U.S. Ser. No. 62/211,617, filed on Aug. 28, 2015 and entitled "System and Method for Preventing Unauthorized Recording, Retransmission and Misuse of Audio and Video", which is incorporated herein by reference in its entity.

TECHNICAL FIELD

The present invention relates to the technical field of content protection, and more specifically relates to a category of products/technologies that aim to secure access to media content and prevent unauthorized reproduction of media content, and signal processing for audio, video, image data, and wireless communications, including, but not limited to, wireless communication for cellular telephones and television.

BACKGROUND

Sound reproduction and recording technology has been in existence since the nineteenth century. Modern day examples of reproduction and recording technologies include, but are not limited to, speakers, camcorders, headsets, smart phones, tablets, computers, digital audio workstations (DAW). By design, these technologies typically enable a user to easily record music and other forms of audio and/or video content, regardless of whether the music or other form of media content that is being recorded is occurring live, such as a user bootlegging audio or video at a concert, or being played back on demand; or whether the media content that is being recorded is being delivered/transmitted via over-the-top streaming media (OTT), radio, cable, satellite, IPTV, a movie/film projector at a movie theater, wireless communication, such as a conversation over a cellular phone, or whether the media content is played from a file stored locally on a user's device, such as a computer, tablet or smart phone while it is being recorded.

Sound reproduction and recording technology has of course many highly beneficial applications and uses. One prevalent detrimental use of recording technology, however, is that such recording technology can be used to create unauthorized (and often illegal) recordings or reproductions of video and audio. Examples of unauthorized recordings include, but are not limited to, an unauthorized recording of a performance or an event (either audio only or audio and video), for example live concerts, live speeches, or sporting events, often referred to as a "bootleg" and "bootlegging"; a recording of a film made with camcorders at a movie theater, often referred to as theatrical "camcording"; a recording made from music while it is streamed from a website, for example a video sharing website or a music streaming service, or played back locally from a computer, set-top box, smart phone or .mp3 player through an output device, such as a direct cable or patch cable, speakers, headphones, earbuds or a headset; an unauthorized recording of a phone call by a participant in the phone conversation; an unauthorized recording of a private video conference, for example a recording of a doctor-patient telemedicine appointment; and a recording created through software that automatically tapes television programming and then uploads the unauthorized recording to a digital locker or a website designed to retransmit pirated content.

Unauthorized recordings have had a far-reaching negative impact on the entertainment vertical, including the music industry, the movie industry and television broadcasters. Since the early $20^{th}$ century, bootlegging music and other audio has been a concern of the entertainment industry. Unfortunately, a countless number of movies and albums have been illegally recorded and/or distributed, denying artists and their recording labels billions of dollars in yearly revenue. The first notable popular album bootleg was Bob Dylan's Great White Wonder (1969). In 1966, Dylan refused to be in the public eye after a serious motorcycle accident. During this period, Dylan unofficially recorded music with various artists. Though these songs were not released by Dylan's label to the general public, they were broadcasted legally on local radio stations in the Los Angeles area. As a result, demand for these songs grew. Eventually a group of bootleggers with connections in the radio industry managed to acquire these unreleased songs and illegally printed and distributed them in 1969.

Piracy of media such as, for example, movies, music, live events and television shows, remains rampant. According to some studies, for example, a high-percentage of all music consumed is downloaded illegally. Individuals with High Fidelity (HI-FI) speakers and an adequate microphone can illegally record copyrighted material. Concertgoers with state of the art recording equipment or even an Apple iPhone can make bootleg recordings without the consent of the artist, recording label, or venue. Movies and Audio can be pirated from bit torrent and filing sharing websites. In addition, audio and/or video can be easily extracted from YouTube through sites like youtube-mp3.org. These sites find the location of the desired file through the website key, extract the fly file from Youtube, and convert it to either an mp3 or mp4 format. No sooner is a television show, movie, sporting event, concert, music video or new recording broadcasted, than it is reproduced illegally within minutes, despite explicit warnings against illegal copying and retransmission of intellectual property.

Embodiments of the present invention, described herein with reference to the attached drawings, recognize the ease with which unauthorized recording of copyrighted, proprietary or confidential media content can be made using recording and sound reproduction technology, and provides a number of technical implementations that effectively distort, mar and deface or otherwise render unusable the unauthorized recordings.

Current approaches, such as watermarking, are after-the-fact identification approaches used to identify the culprit who has recorded and retransmitted intellectual property. In contrast, embodiments of the present invention provide technical implementations that prevent, or at least significantly deter, piracy before is succeeds, by rendering the illegally captured content useless.

SUMMARY

In some embodiments, a method includes receiving, at a device, digital audio content to be converted by a digital-to-analog converter to produce analog audio content. The digital audio content has at least one audible frequency. The method also includes selecting, at the device, a first signal and a second signal to output with the analog audio content. The first signal has an inaudible carrier frequency and a bandwidth, and the second signal also has an inaudible carrier frequency and a bandwidth. A difference between the first signal and the second signal is an undesired audible signal. The method further includes outputting, from the device, the analog audio content, the first signal and the second signal, such that when the analog audio content is detected by a recording device the undesired audible signal is detected with the analog audio content.

BRIEF DESCRIPTION OF THE DRAWINGS

FIGS. 7A-7B are graphs illustrating a strong jamming signal implementation by an unauthorized audio recording prevention system, according to an embodiment.

FIG. 9 is a flow chart illustrating a method 900 to prevent unauthorized recording of media content, according to an embodiment.

DETAILED DESCRIPTION

An individual seeking to create an unauthorized recording or retransmission can play audio at an audio source. The individual can directly connect the audio source to the input of an audio interface connected to a recording or retransmission device or can position a recording device such as a microphone within audible proximity of an audio output device such as a speaker and record or retransmit the output audio resulting in a relatively high quality audio file or stream that can be illegally distributed. Similarly, a bootlegger can record a movie by using a video camera. Embodiments of the present invention, described with reference to the attached diagrams (figures) provide technical implementations that jam audio as well as jam the audio portion of video content to eliminate/disrupt the possibility of recording its analog signal and creating a bootlegged copy. Exemplary implementations described herein integrate multiple high, inaudible (e.g., ultrasonic) frequencies with the audio to create a strong jamming signal when the audio is bootlegged (re-recorded), distorting the bootleg and making it unusable. See generally FIG. 1A and FIG. 1B attached hereto.

Figure 2:
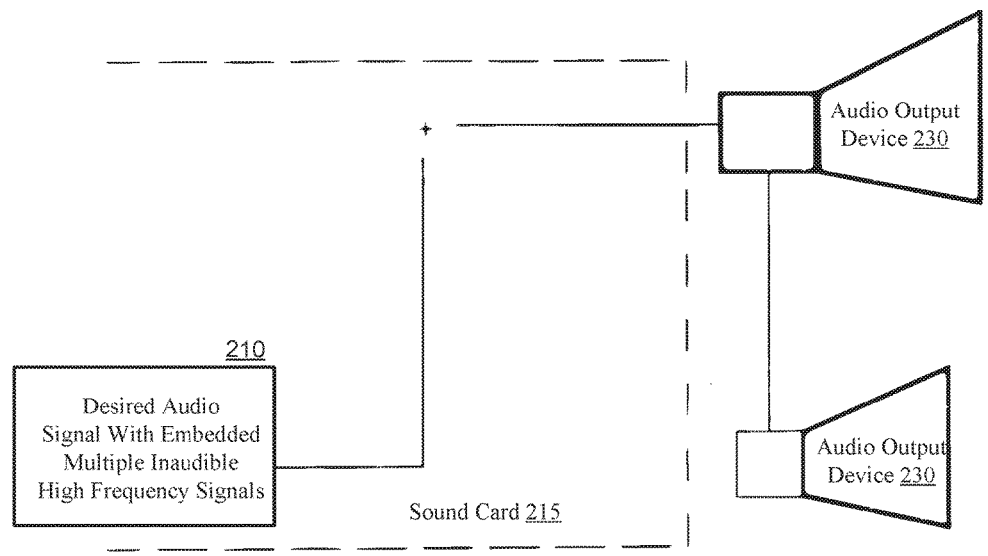
FIG. 2 is a diagram illustrating a software-based implementation of an unauthorized audio recording prevention system, according to an embodiment.
Figure 3:
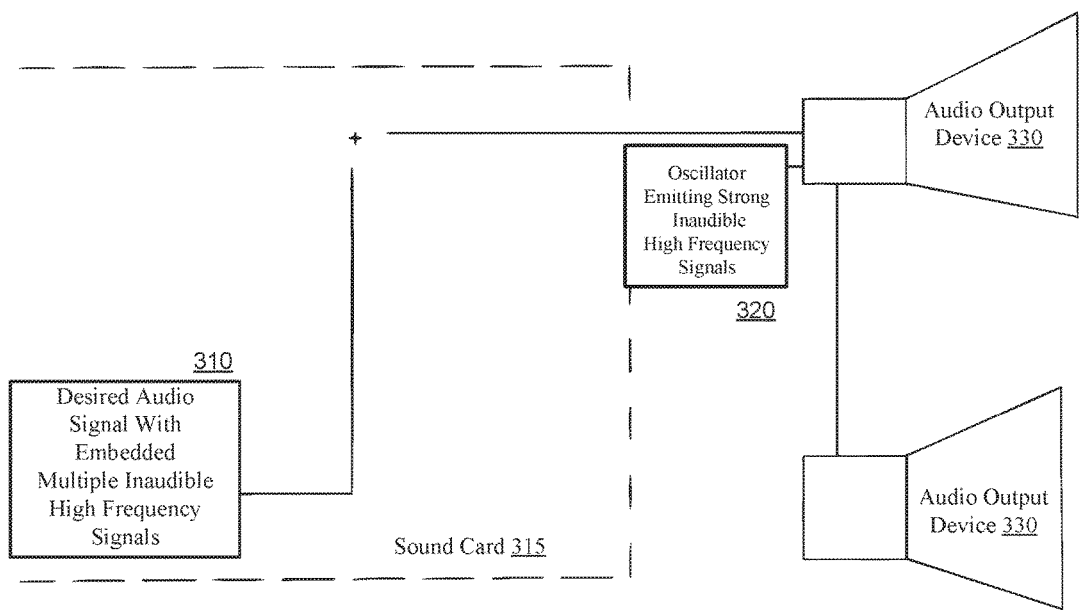
FIG. 3 is a diagram illustrating a software-based and hardware-based implementation of an unauthorized audio recording prevention system, according to an embodiment.

Embodiments of the present invention can be implemented in several ways. A first implementation does not require additional hardware on the output device, for example a software-based implementation or an implementation that does not require additional hardware on the output device to jam the audio, as shown in FIG. 2. This implementation does not require additional hardware; instead the multiple high inaudible signals are embedded into the desired audio 210. These high frequency inaudible signals can be either mono or stereo. For example, one high frequency signal can be set to the left speaker, and the other high frequency signal can be set to the right speaker (stereo), or all high frequency signals can be set to both speakers (mono). A second implementation is a software and hardware implementation, as shown in FIG. 3. In this implementation, multiple inaudible high frequency signals are embedded into the desired audio (software-based component) 310 in addition to having an oscillator 320 inside of the output device (hardware-based component), which emits a strong inaudible high-frequency signal.

Figure 4:
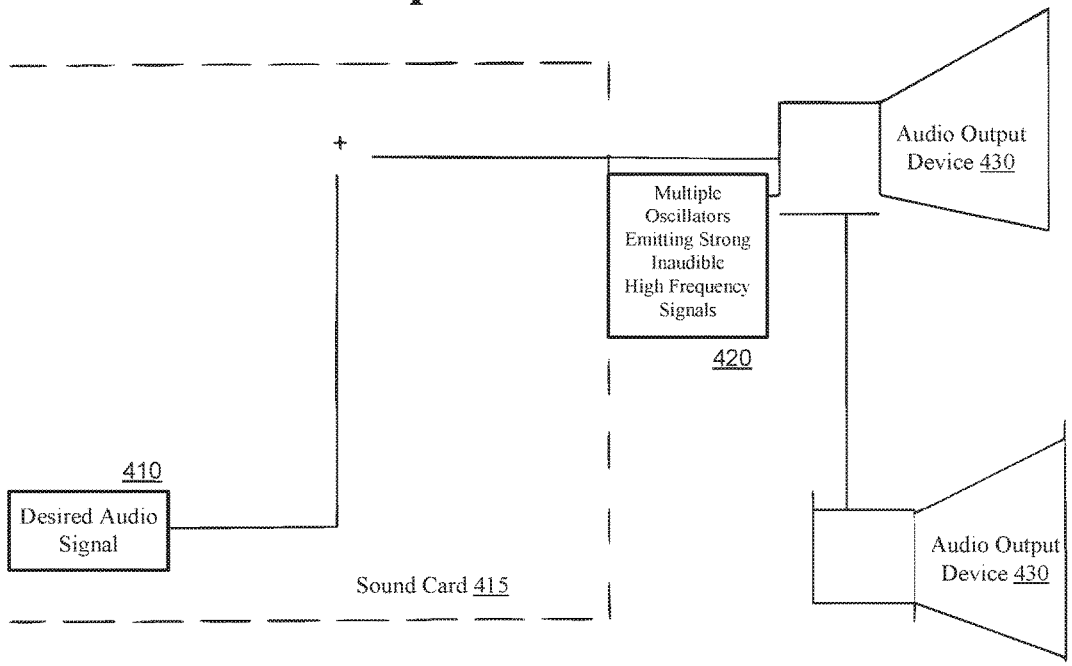
FIG. 4 is a diagram illustrating a first hardware-based implementation of an unauthorized audio recording prevention system, according to an embodiment.
Figure 5:
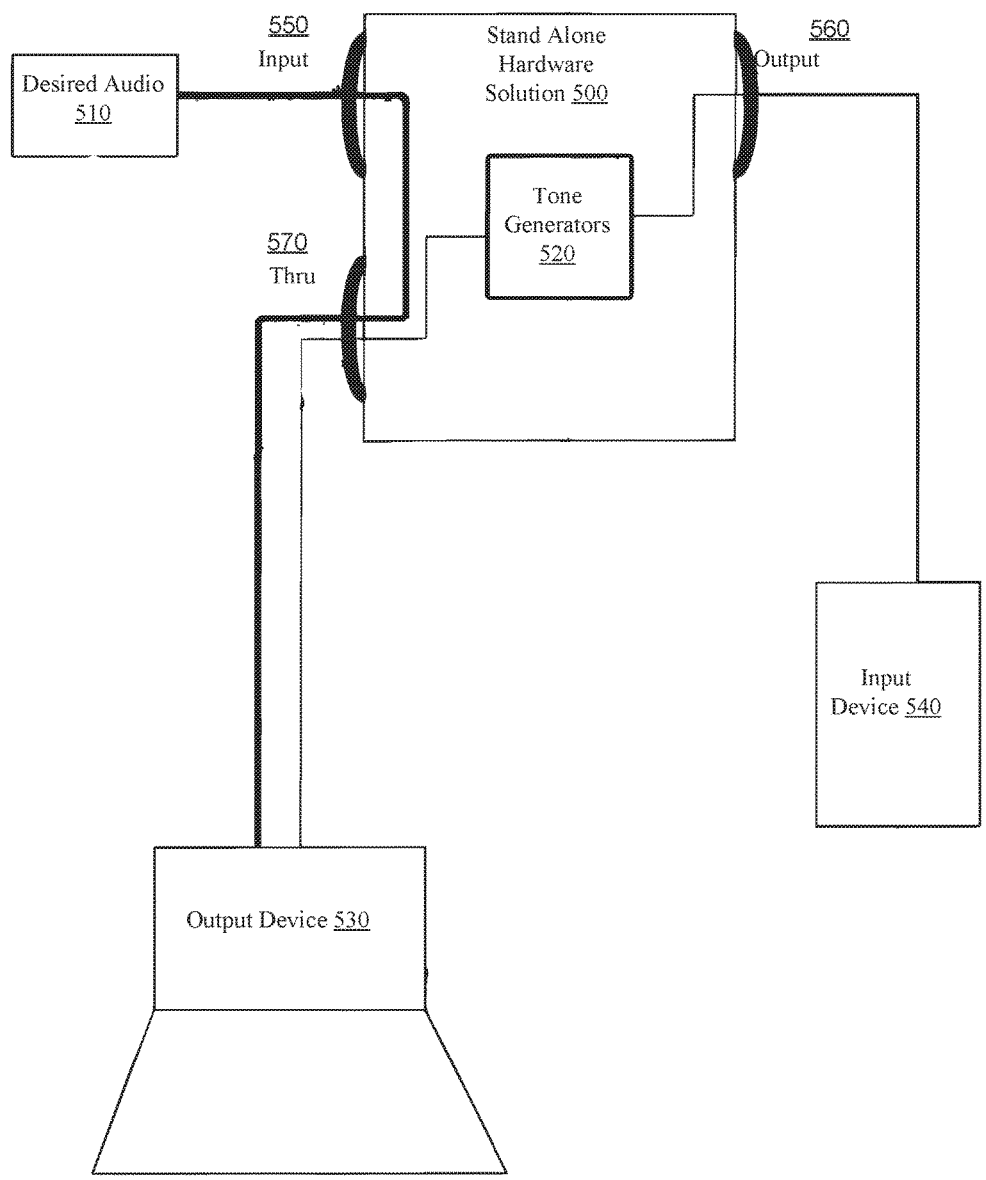
FIG. 5 is a diagram illustrating a second hardware-based implementation of an unauthorized audio recording prevention system, according to an embodiment.

A third implementation is a first hardware-based implementation as shown in FIG. 4. This implementation does not require additional software. This implementation involves implanting multiple oscillators 420 into the output device, each emitting strong inaudible high frequencies. A second hardware-based implementation, as shown in FIG. 5, uses a single input/thru/output or multi input/thru/output stand-alone device 500 that generates multiple inaudible high frequencies by using oscillators, tone generators (either software-based tone generators, hardware-based tone generators, or both), or a combination of the two, 520. The input/output/thru, 550, 560, and 570, can be, and not limited to an XLR, ¼" TRS, ⅛", ¼" high impedance, unbalanced (also known as a high-z input on many recording industry outboard equipment) or cables used for a surround sound system. This device 500 can also have inputs/thru/outputs. 550, 560, and 570, that do not match. For example (and not limited to), one input 550 can be a ¼" (either TRS or high impedance, unbalanced) and the output 560 can be an XLR; or the input 550 can be a XRL and the thru 570 can be a ¼" (TRS or high impedance, unbalanced). This stand-alone device 500 can also have a Direct Input (DI) or Preamp function. The stand-alone implementation can be used to prevent the bootlegging of live content, for example (and not limited to), sports events, music concerts, live speeches, audio in movie theatres, etc.

It should also be recognized that the first hardware-based implementation described herein, as shown in FIG. 4, can also create the inaudible high frequencies through hardware-based and/or software-based tone generators.

These implementations are based upon the inventors' realization that the human ear and recording devices register sound differently, and the methodologies/implementations described herein take advantage of these distinctions to prevent unauthorized reproduction and piracy.

As outlined above, when the embedded frequencies are presented to the human ear, the ear interprets these high frequencies as different or distinct frequencies. As a result, humans cannot hear the non-linear artifacts of combining the embedded high frequencies. This is due to the fact that our ears are linear enough and have a large enough dynamic range (about 120 dB) not to blend these frequencies together.

On the other hand, recording devices (such as microphones) and audio to digital (A/D) converters are typically much less linear and have a much smaller dynamic range (for example, 14 bits=/about 86 dB, 16 bits=/about 98 dB, 24 bit=about 116 dB).

As a result, when the input device tries to illegally reproduce sound, the multiple inaudible high frequencies blend together. This causes the recording device to interpret these frequencies as their original tones, but also the difference between those tones.

Figure 1A:
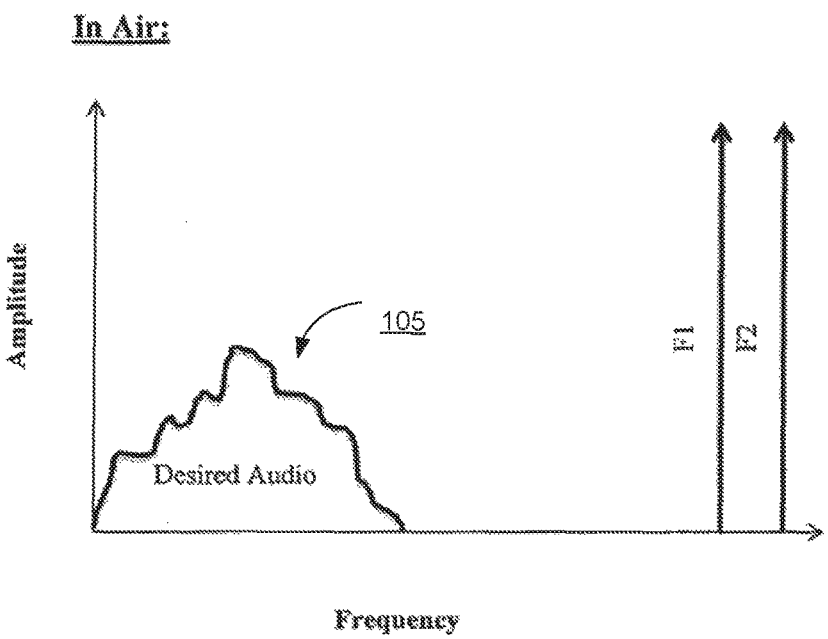
FIGS. 1A-1B are graphs illustrating a signal jammer implementation of an unauthorized audio recording prevention system, according to an embodiment.
Figure 1B:
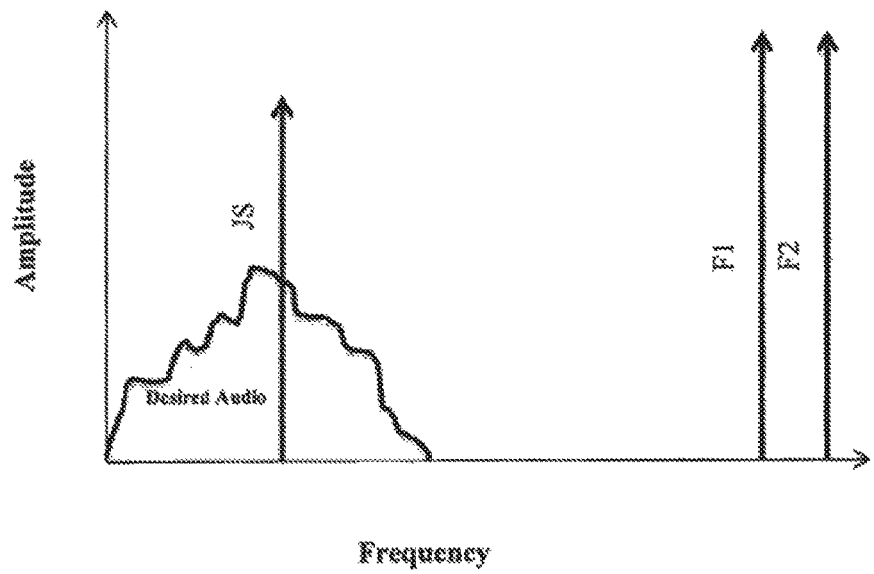

For example, as shown in FIG. 1A, if the high inaudible frequencies are 21 kHz (shown as F1 in FIG. 1A) and 22 kHz (shown as F2 in FIG. 1A), human ears can hear the desired audio 105 without any issue. As shown in FIG. 1B, a recording device however, interprets the frequencies as 21 kHz (shown as F1 in FIG. 1B) and 22 kHz (shown as F2 in FIG. 1B) separately, but also records a 1 kHz signal (shown as JS in FIG. 1B), which is loud and audible to the human ear.

The multiple high frequency signals include a carrier bandwidth or multiple carrier bandwidths and a jamming bandwidth or multiple jamming bandwidths that will transpose the jamming bandwidth into the desired audio's bandwidth as it is registered by non-linear electronic devices.

This 1 kHz signal is the jamming signal (JS in FIG. 1B) according to one implementation of the present invention. See e.g., FIGS. 1A and 1B. In other words, the jamming signal can be the difference between the multiple inaudible high frequency signals, which is emitted and interpreted by less linear recording devices as well as audio to digital (A/D) converters.

A jamming signal according to another implementation of the present invention is created to emit a high inaudible frequency that is greater than half the sample rate (JS>½ SR), as shown in FIG. 7A. The jamming signal can include, but not limited to, a sinusoidal wave, noise, speech (e.g., the jamming signal can include an indicator stating that this file is copyrighted), or an inversion of the desired audio signal, as mentioned in FIG. 6. For example, if the sample rate (SR) is the standard 44.1 kHz, than the high frequency can be set to have to a frequency higher than 22.05 kHz. By doing so, according to the Nyquist Theorem, the jamming signal can be aliased, as shown in FIG. 7B, thus creating an audible, distorted, and distracting tone that appears in the unauthorized duplicating of the desired audio 705, rendering it unusable. See attached FIG. 6, FIG. 7A, FIG. 7B.

The jamming signal associated with implementations of the present invention produces a loud, distracting sound that registers in an unauthorized recording, but cannot be heard by the human ear when the sound is not recorded. The distracting sound resulting from the jamming signal can effectively deter bootleggers from attempting to rerecord audio from a high fidelity speaker or videotape/camcorder movies (the movie's audio is defaced), record music without authorization at live shows, or any other method of illegally recording copyrighted material, as the jamming signal renders the unauthorized recording unusable and without value In one embodiment, video or audio content is streamed on-demand over a network or streamed live over a network, such as the Internet; the video or audio content has embedded into its audio stream multiple high frequencies that are inaudible to the human ear; the media content is delivered to a media player and then through the video and audio interface, such as a sound card or an external audio interface; the media content is delivered through the audio output, and in the case of video, a screen; a recording device, such as speaker, a microphone, camcorder, or an audio cable (for example, an ⅛"/auxiliary, ¼" TRS, ¼" instrument level cable or XLR cable) connected directly to the input of the recording device samples the content delivered through the output device; records the audio output, and in the case of video, captures the images rendered on the screen; the recording device is non-linear and therefore registers the multiple high frequencies as separate frequencies as well as the discrepancy between the multiple high frequencies; included in the recording is a jamming signal, the difference between the multiple high frequencies; the content captured by the recording device is played back, either from the recording device, or through another device, including, but not limited to, a computer, set-top box, smart phone or stereo, etc.; the jamming signal in the recording produces a loud and distracting sound included in the original content's audio, thereby rendering the unauthorized recording useless.

In another embodiment, video or audio content delivered to a television through cable wires, DSL or a fiber optic network has embedded into its audio multiple high frequencies that are inaudible to the human ear, which, when recorded by a recording device, includes a jamming signal.

In yet another embodiment, video or audio content delivered through satellite has embedded into its audio multiple high frequencies that are inaudible to the human ear, which, when recorded by a recording device, includes a jamming signal.

In yet another embodiment, video or audio content transmitted during two-way, synchronous communications, such a telephone conversation over a wireless cellular network or over a wired connection, or two-way communication via a web conferencing or video conferencing solution over a network, such as the Internet, has embedded into its audio multiple high frequencies that are inaudible to the human ear, which, when recorded by a recording device, includes a jamming signal.

In yet another embodiment, video or content that is synced/download to a device, such as a computer, tablet or smart phone, set-top box, or a web-enabled television, has embedded into its audio multiple high frequencies that are inaudible to the human ear, which, when recorded by a recording device, includes a jamming signal.

In yet another embodiment, while media is being delivered through a movie/film projector a separate standalone jamming device or a jamming device integrated within the audio output system (for example the speakers), emits high frequencies that are inaudible to the human ear, which, when recorded by a recording device, for example a camcorder, includes a jamming signal.

In yet another embodiment, during a live performance or event, such as a concert, speech, a standalone jamming device or a jamming device integrated within the audio output system (for example the speakers), emits high frequencies that are inaudible to the human ear, which, when recorded by a recording device, for example a camcorder, includes a jamming signal, which renders useless the audio portion of an authorized video or audio recording, i.e., a bootleg.

In some embodiments, these multiple inaudible high frequencies (either one, just a few, or all of them) can either remain at a constant frequency or they can sweep once, just a few times, or consistently to a higher or lower frequency. It can also be a set of bandwidths distributed around ultrasonic carrier frequencies. This signal can be a sine-wave, white noise, or other interfering audio. This can be applied to the software-based, software- and hardware-based, and hardware-based implementations.

Software-Based Implementation:

The following description is provided with reference to the attached diagram labelled "Software-Based Implementation" (FIG. 2). Before the desired audio is obtained by the user, multiple inaudible high frequencies are embedded in to the desired audio 210. When the desired audio embedded with the multiple frequencies is played by the playback device 230, it will go through its audio card/audio interface 215/its Digital to Audio Converter (DAC, not shown in FIG. 2). The embedded desired audio 210 plays through the output device 230. The embedded desired audio 210 then gets resampled by either being rerecorded by a microphone, or by going straight into a computer, for example (and not limited to) by hooking up the playback device directly to the recording device through an auxiliary cable. In the instance of bootlegging video by using an external capturing device, the embedded desired audio 210 that is integrated with the video travels from the playback device (e.g., computer, DVD, Blueray, set-top box, etc.) 230 to the piece of capturing hardware. This capturing hardware can be for example, but not limited to, a computer or a camcorder. When the embedded desired audio 210 is being resampled/rerecorded, the non-linear capturing device interprets these frequencies not only as separate frequencies, but also as the difference between them, thus creating a jamming signal that is loud and disruptive. For example, if the two inaudible high frequencies are 20 and 21 kHz, then the jamming signal would be 1 kHz. Thus, the duplication of the audio would have the desired audio and the jamming signal.

Software-Based and Hardware-Based Implementation:

The following description is provided with reference to the attached diagram labelled "Software-Based and Hardware-Based" (FIG. 3). Before the desired audio is obtained by the user, multiple inaudible high frequencies are embedded in to the desired audio 310. When the desired audio embedded with the multiple frequencies 310 is played by the playback device, it will go through its audio card/audio interface 315/its Digital to Audio Converter (DAC, not shown in FIG. 3). The embedded desired audio 310 then travels to the output device 330 and is added in the analog domain. While the embedded desired audio is playing, the output device 330 is also emitting one or multiple high frequencies. These frequencies can be created by one or multiple oscillators or tone generators (either software-based tone generators or hardware-based tone generators) 320 that are integrated into the output device 330. The desired audio 310 is then resampled/rerecorded. Above, examples for rerecording/resample methods for video and audio have been mentioned. The duplicate will have the embedded desired audio as well as a strong jamming signal (the difference between the inaudible multiple frequencies).

Hardware-Based Implementation.

The following description is provided with reference to the attached diagram labelled "Hardware-Based Implementation 1" (FIG. 4). The desired audio 410 is executed by the playback device. It then goes through the soundcard/audio interface 415/its DAC (not shown in FIG. 4). The desired audio 410 then goes through the output device 430 and is added in the analog domain. The output device 430 is emitting one or multiple high frequency signals. These signals can be created by one or multiple oscillators or generators (either software-based tone generators or hardware-based tone generators) 420 that are integrated into the output device. The desired audio and the multiple inaudible high frequency signals are resampled/rerecorded with a capturing device. The bootlegged duplicate now has both the desired audio and the Jamming signal.

Hardware-Based Implementation 2: The following description is provided with reference to the attached diagram labelled "Hardware-Based 2" (FIG. 5). (stand-alone jamming device 500).

A. The multiple inaudible high frequency signals are emitted from the signal generator (either software-based or hardware-based tone generator). They travel out of the output of the device. They go into the input of a console (e.g., a mixing board) or other audio interface. The multiple inaudible frequencies are then combined with the desired audio and travel to the output device (e.g., speakers, PA system, or surround sound system).

B. The desired audio 510 enters through the console (e.g., mixing board, not shown in FIG. 5) or other audio interface. The desired audio 510 then travels through the output of the console or other audio interface and into the input 550 of the stand-alone jammer 500. The desired audio 510 and the multiple inaudible frequencies, which are created by signal generator (either software-based or hardware-based tone generators) 520, leave the "thru" output 570. The desired audio 510 and the multiple inaudible frequency signals then enter the output device 530 (e.g., the speaker, PA system, or surround sound system).

In some implementations, the unauthorized recording prevention process includes both A and B, or just A or B. If the implementation integrates just B, the thru 530 can also be labeled as for example, but not limited to, the "Output."

Figure 6:
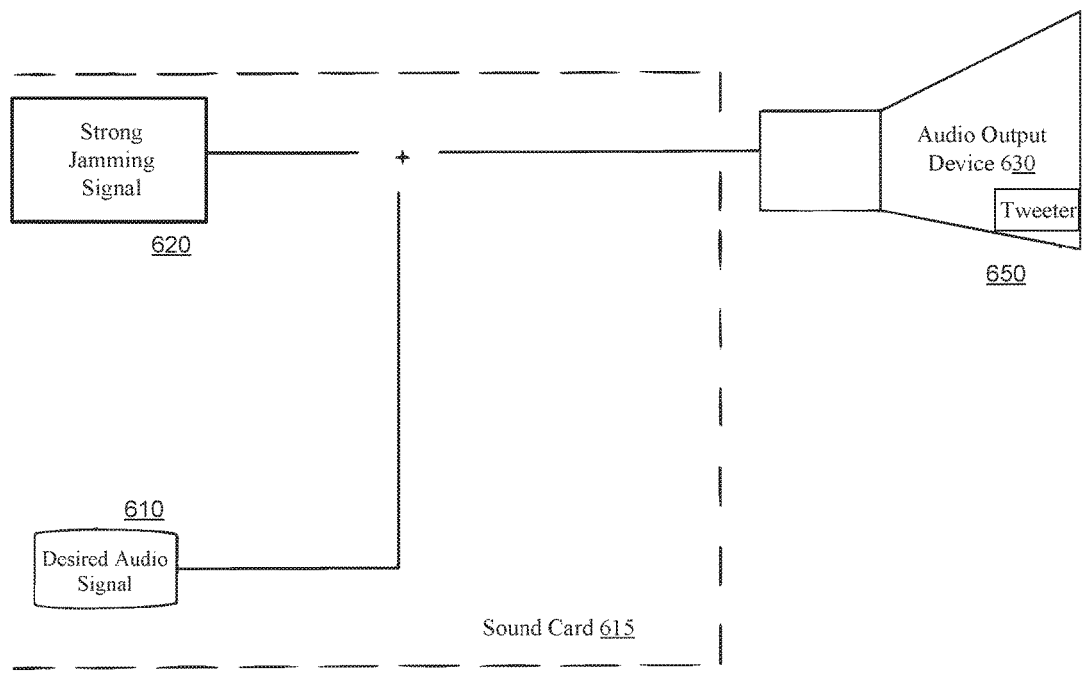
FIG. 6 is a diagram illustrating an implementation of an unauthorized audio recording prevention system with a strong jamming signal, according to an embodiment.

FIG. 6 is a diagram illustrating an implementation of an unauthorized audio recording prevention system with a strong jamming signal, according to an embodiment. A signal generator 620 can emit a high inaudible frequency that is greater than half the sample rate (JS>½ SR). The jamming signal can include, but not limited to, a sinusoidal wave, noise, speech (e.g., the jamming signal can include an indicator stating that this file is copyrighted), or an inversion of the desired audio signal. The desired audio signal 610 can be combined (or embedded) with the strong jamming signal 620 and then sent through a playback device's audio card/audio interface 615/its DAC (not shown in FIG. 6). The combined desired audio plays through the output device 630. In some implementations, while the combined desired audio is playing, the output device 630 is also emitting one or multiple high frequencies. These frequencies can be produced by one or multiple oscillators, signal generators, or tweeters 650 that are integrated into the output device 630. The embedded desired audio then gets resampled by either being rerecorded by a microphone, or by going straight into a computer, for example (and not limited to) by hooking up the playback device directly to the recording device through an auxiliary cable. The strong jamming signal 620, according to the Nyquist Theorem, can create an audible, distorted, and distracting tone that appears in the unauthorized duplication of the desired audio, rendering it unusable for the purpose of listening without distraction.

Figure 8:
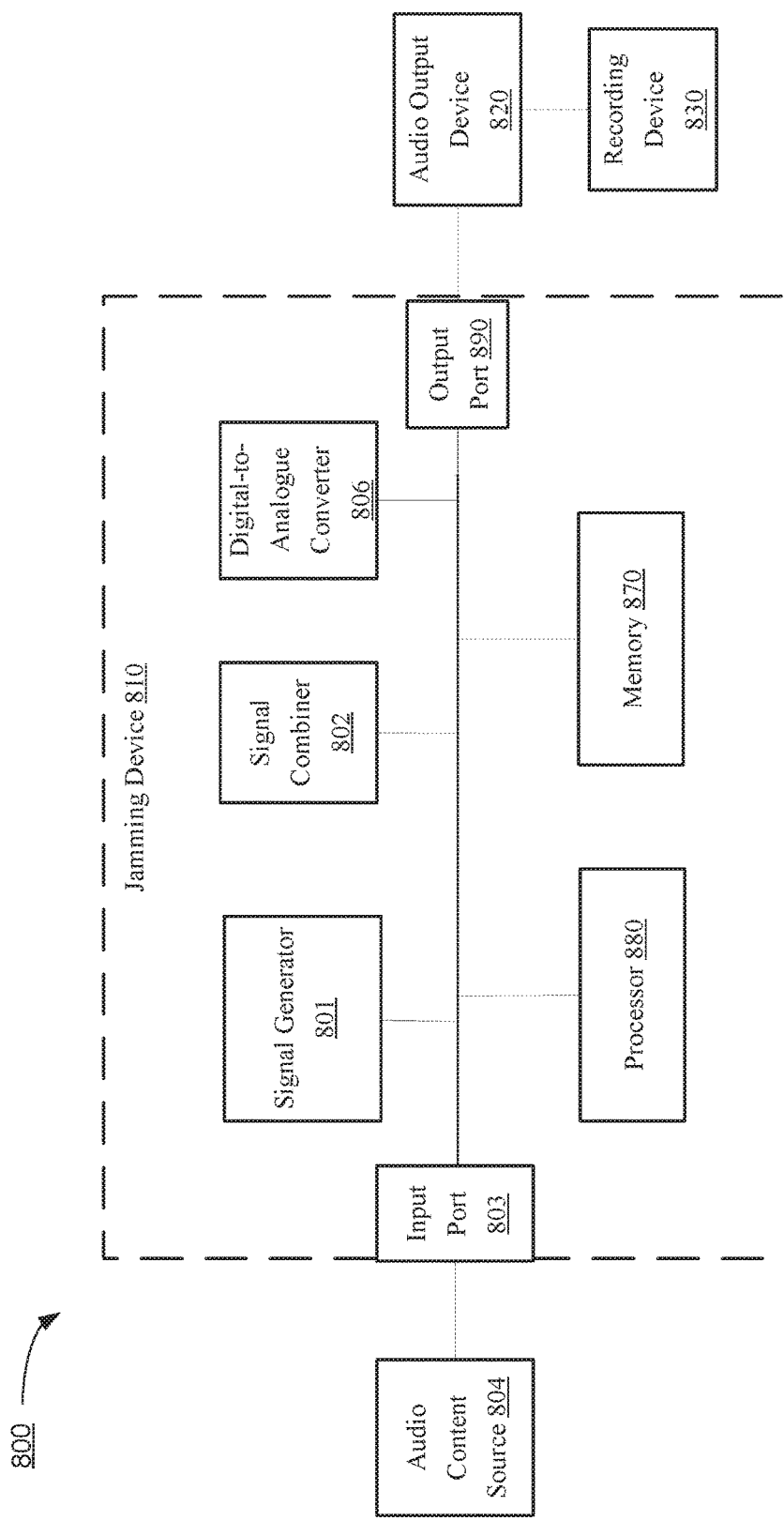
FIG. 8 is a block diagram of an unauthorized audio recording prevention system 800, according to an embodiment.

FIG. 8 is a block diagram of a system for preventing unauthorized audio recording 800, according to an embodiment. The system for preventing unauthorized audio recording 800 can include a jamming device 810, an audio content source 804, a recording device 830, and an audio output device 820. The jamming device 810 is operatively coupled to the audio content source 804 and the audio output device 820. The audio output device 820 is operatively coupled to the recording device 830. The audio content source 804 can be any content source that generates audio, including, for example, a radio program, a movie, a television show, a concert, a sporting event. The recording device 805 can be any device that records media content having audio content, including, for example, a camrecorder, a mobile phone, a voice recorder, a computer. The audio output device 820 can be any device that outputs media content having audio content, for example, a speaker, or a screen.

As shown in FIG. 8, the jamming device 810 includes an input port 803, an output port 890, a processor 880, a memory 870, a signal generator 801, and a signal combiner (or a mixing board, or a console) 802, and a digital-to-analog converter (DAC) (also referred herein to as "digital-to-audio converter") 806. In some implementations, the jamming device 810 can be within a single physical device. In some implementations, the jamming device 810 can be included within multiple physical devices, each of which can include one or multiple modules and/or components shown in FIG. 8. In some implementations, the jamming device 810 can be any combination of hardware and/or software (stored and/or executing in hardware). In some implementations, the jamming device 810 can include, for example, a field-programmable gate array (FPGA), an application specific integrated circuit (ASIC), a digital signal processor (DSP), and/or the like.

Each module or component in the jamming device 810 can be operatively coupled to each remaining module or component. Each module or component in the jamming device 810 can be any combination of hardware and/or software (stored and/or executing in hardware) capable of performing one or more specific functions associated with that module. In some implementations, a module or a component in the jamming device 810 can include, for example, a field-programmable gate array (FPGA), an application specific integrated circuit (ASIC), a digital signal processor (DSP), and/or the like.

The memory 870 can be, for example, a random-access memory (RAM) (e.g., a dynamic RAM, a static RAM), a flash memory, a removable memory, and/or so forth. In some embodiments, the memory 870 can include, for example, a database, process, application, virtual machine, and/or some other software modules (stored and/or executing in hardware) or hardware modules configured to execute an unauthorized recording prevention process. In such implementations, instructions of executing the unauthorized recording prevention process and/or the associated methods (e.g., such as instructions for the input port 803, the output port 890A, the signal generator 801, the signal combiner 802, the DAC 806, the processor 880, and the memory 870) can be stored within the memory 870 and executed at the processor 880.

The processor 880 can be configured to control, for example, the operations of the input port 803, the output port 890, write data into and read data from the memory 870, and execute the instructions stored within the memory 870. The processor 880 can also be configured to control, for example, the operations of the signal generator 801 and the signal combiner 802, as described in further detail herein. In some embodiments, the signal generator 801 and the signal combiner 802 are stored in the memory 870 and executed by the processor 880. In some embodiments, under the control of the processor 880 and based on the methods or processes stored within the memory 870, the signal generator 801, the signal combiner 802, DAC 806, the input port 803, and output port 890 can be configured to collectively execute an authorized recording prevention process as described herein.

The input port 803 and the output port 890 can be any entity that can actively communicate with a coupled device directly or over a network. In some implementations, such a port need not necessarily be a hardware port, but can be a virtual port or a port defined by software. The input port 803 can be operatively coupled to the audio content source 804 and any component of the jamming device 810. The input port 803 can be configured to, among other functions, receive data (e.g., audio content) and/or information from the audio content source 804, and send data, configuration modifications, commands, and/or instructions to the modules and/or components in the jamming device 810.

The output port 890 can be operatively coupled to an audio output device 820 and any component of the jamming device 810. The output port 890 can be configured to receive data and/or information from the modules and/or components in the jamming device 810, and send data (e.g., audio content), configuration modifications, commands, and/or instructions to the audio output device 820.

The jamming device 810 can receive digital audio content having a set of audible frequencies from the audio content source 804 via the input port 803. The signal generator 801 can generate a first signal and a second signal, each of which having an inaudible carrier frequency and a bandwidth. The frequency difference between the first signal and the second signal (i.e., the frequency of the jamming signal) is an undesired audible frequency. The signal generator 801 can be an oscillator, a tone generator (either software-based tone generators as described with respect to FIG. 2 and FIG. 3, hardware-based tone generators as described with respect to FIGS. 3-5, or both as described with respect to FIG. 3), or a combination of the two. For example, if the high inaudible frequencies of the first signal and the second signal are 21 kHz and 22 kHz, respectively, human ears can hear the desired audio without any issue. A recording device, however, interprets the frequencies as 21 kHz and 22 kHz separately, but also records a 1 kHz signal, which is loud and audible to the human ear.

The signal combiner 802 can then combine (or embed, or mix) the digital audio content, the first signal and the second signal to produce an output audio signal. After the DAC 806 converts the output audio signal from a digital format to an analog format, the analog audio signal can be output via the output port 890 to the audio output device 820. When the recording device 830 records such analog audio signal, the undesired audible frequency is also recorded with the analog audio content, thus producing an audible, distorted, and distracting tone that appears in the unauthorized duplication of the desired audio content and rending it unusable for the purpose of listening without distraction.

In some implementations, the first signal and the second signal generated by the signal generator 801 can be static over a period of time or varied over a period of time. In some implementations, the jamming device 810 can output the first signal and the second signal at a same audio output device, or separately via different audio output devices. The jamming device 810 can be operatively coupled to a set of audio output devices and each of the audio output devices output a signal individually.

In some implementations, the digital audio content received from the audio content source 804 can be encrypted. The jamming device 810 can include a decryption component (not shown), which can be configured to decrypt the digital audio content. The decrypted digital audio content, after combined with the first signal and the second signal, can then be converted to analog audio content for output. Similarly, each of the first signal and the second signal has an inaudible carrier frequency and a bandwidth. The frequency difference between the first signal and the second signal (i.e., the frequency of the jamming signal) is an undesired audible frequency. When the recording device 830 records such analog audio signal, the undesired audible frequency is also recorded with the analog audio content, thus producing an audible, distorted, and distracting tone that appears in the unauthorized duplication of the desired audio content and rending it unusable for the purpose of listing without distraction.

FIG. 9 is a flow chart illustrating a method 900 to prevent unauthorized recording of media content, according to an embodiment. The prevention method 900 can be executed at, for example, a jamming device such as the jamming device 810 shown and described with respect to FIG. 8.

At 902, the jamming device receives digital audio content via an input port, such as the input port 803 shown and described with respect to FIG. 8. The digital audio content, having a set of audible frequencies, is to be converted to analog audio content and output by an audio output device, such as the audio output device 820 shown and described with respect to FIG. 8.

At 904, the jamming device selects a first signal and a second signal to output with the analog audio content. The first signal has an inaudible carrier frequency and a bandwidth, and the second signal also has an inaudible carrier frequency and a bandwidth, which are generated by a signal generator (such as the signal generator 801 shown and described with respect to FIG. 8.) A difference between the first signal and the second signal is an undesired audible signal. The signal generator 801 can be an oscillator, a tone generator (either software-based tone generators, hardware-based tone generators, or both), or a combination of the two. For example, if the high inaudible frequencies of the first signal and the second signal are 21 kHz and 22 kHz, respectively, human ears can hear the desired audio without any issue. A recording device, however, interprets the frequencies as 21 kHz and 22 kHz separately, but also records a 1 kHz signal, which is loud, audible and undesirable to the human ear.

At 906, prior to the jamming device outputting via an audio output device, the signal combiner, such as the signal combiner 802 shown and described with respect to FIG. 8, then combines (or embeds, or mixes) the digital audio content, the first signal and the second signal to produce an output audio signal. After a digital-to-analog converts the output audio signal from a digital format to an analog format, the analog audio signal can be output via an output port to the audio output device, such as the output port 890 and audio output device 820 shown and described with respect to FIG. 8. When the recording device records such analog audio signal, the undesired audible signal is also recorded with the analog audio content, thus creating an audible, distorted, and distracting tone that appears in the unauthorized duplicating of the desired audio content and rending it unusable.

As used in this specification, the singular forms "a," "an" and "the" include plural referents unless the context clearly dictates otherwise. Thus, for example, the term "a recording device" is intended to mean a single recording device or multiple recording devices. For another example, the term "an output port" can mean a single output port or multiple output ports.

As used herein, the terms "about" and "approximately" generally mean plus or minus 10% of the value stated. For example, about 120 dB would include 108 dB and 132 dB.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or microinstructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

What is claimed is:

1. A method, comprising:
   receiving, at a device, digital audio content to be converted by a digital-to-analog converter to produce analog audio content, the digital audio content having at least one audible frequency;
   selecting, at the device, a first signal and a second signal to output with the analog audio content, the first signal having an inaudible carrier frequency and a bandwidth, the second signal having an inaudible carrier frequency and a bandwidth, a difference between the first signal and the second signal being an interfering audible signal, the interfering audible signal not altering the analog audio content in at least a portion of a frequency range of the analog audio content, the interfering audible signal having an audible frequency based on a difference between the inaudible carrier frequency of the first signal and the inaudible carrier frequency of the second signal; and
   outputting, from the device, (1) the analog audio content, (2) the first signal and (3) the second signal, such that when the analog audio content is detected by a recording device the interfering audible signal is detected with the analog audio content.

2. The method of claim 1, wherein the inaudible carrier frequency of the first signal is varied over a time period.

3. The method of claim 1, wherein the first signal is static over a time period.

4. The method of claim 1, further comprising:
   embedding the first signal and the second signal into a digital audio stream of the digital audio content prior to the outputting.

5. The method of claim 1, wherein the outputting includes outputting the analog audio content with the first signal and the second signal via a single audio output device.

6. The method of claim 1, wherein the outputting includes outputting the analog audio content and the first signal via a first audio output device and outputting the second signal via a second audio output device different from the first audio output device.

7. The method of claim 1, wherein the outputting includes outputting the first signal via a first audio output device, outputting the second signal via a second audio output device, and outputting a third audio signal via a third audio output device.

8. The method of claim 1, wherein the inaudible carrier frequency of the first signal and the inaudible carrier frequency of the second signal are greater than the at least one audible frequency of the digital audio content.

9. The method of claim 1, wherein the selecting the first signal and the second signal is at a time after the digital audio content is converted to the analog audio content.

10. An apparatus, comprising:
a jamming device including an input port, an output port, and a signal generator operatively coupled to the input port and the output port,
the input port configured to receive audio content to be output, the audio content having at least one audible frequency,
the signal generator configured to generate a first signal and a second signal, the first signal having an inaudible carrier frequency and a bandwidth, the second signal having an inaudible carrier frequency and a bandwidth, a difference between the first signal and the second signal being an interfering audible signal having an audible frequency based on a difference between the inaudible carrier frequency of the first signal and the inaudible carrier frequency of the second signal being an audible frequency, the interfering audible signal not altering the audio content in at least a portion of a frequency range of the audio content,
the output port configured to output the audio content with the first signal and the second signal such that when the audio content is detected by a recording device the interfering audible signal is detected with the audio content.

11. The apparatus of claim 10, wherein the signal generator is configured to vary the first signal over a time period.

12. The apparatus of claim 10, wherein the signal generator is configured to maintain the first signal as static over a time period.

13. The apparatus of claim 10, wherein the jamming device includes a mixing board configured to embed the first signal and the second signal into a digital audio stream of the audio content prior to the outputting.

14. The apparatus of claim 10, wherein the output port is configured to output the audio content with the first signal and the second signal via a single audio output device.

15. The apparatus of claim 10, wherein the output port is configured to output the audio content and the first signal via a first audio output device and output the second signal via a second audio output device different from the first audio output device.

16. The apparatus of claim 10, wherein the output port is configured to output the first signal via a first audio output device, output the second signal via a second audio output device, and output a third audio signal via a third audio output device.

17. The apparatus of claim 10, wherein the inaudible carrier frequency of the first signal and the inaudible carrier frequency of the second signal are greater than the at least one audible frequency of the audio content.

18. The apparatus of claim 10, wherein the signal generator is configured to generate the first signal and the second signal at a time after the audio content is converted from digital audio content to analog audio content.

19. A system, comprising:
a memory, and
a processor operatively coupled to the memory, the processor configured to generate a first inaudible signal and a second inaudible signal to output with audio content having at least one audible frequency, the first inaudible signal having an inaudible carrier frequency and a bandwidth, the second inaudible signal having an inaudible carrier frequency and a bandwidth, a difference between the first inaudible signal and the second inaudible signal being an interfering audible signal, the interfering audible signal not altering the audio content in at least a portion of a frequency range of the audio content, the interfering audible signal having an audible frequency based on a difference between the inaudible carrier frequency of the first inaudible signal and the inaudible carrier frequency of the second inaudible signal,
the processor configured to output the first inaudible signal and the second inaudible signal with the audio content such that when the audio content is detected by a recording device the interfering audible signal is detected with the audio content.

20. The system of claim 19, wherein the processor includes a mixing board.

21. The system of claim 19, wherein the processor is configured to output the first inaudible signal via a first audio output device, output the second inaudible signal via a second audio output device, and output a third audio signal via a third audio output device.

22. The system of claim 19, wherein the inaudible carrier frequency of the first inaudible signal and the inaudible carrier frequency of the second inaudible signal are greater than the at least one audible frequency of the audio content.

23. The system of claim 19, wherein the processor is configured to generate the first inaudible signal and the second inaudible signal at a time after the audio content is converted from digital audio content to analog audio content.

24. A method, comprising:
receiving, at a device, encrypted digital audio content to be decrypted to produce decrypted digital audio content that is to be converted by a digital-to-analog converter to produce analog audio content, the decrypted digital audio content and the analog audio content each having at least one audible frequency;
selecting, at the device, a first signal and a second signal to output with the analog audio content within the same device, the first signal having an inaudible carrier frequency and a bandwidth, the second signal having an inaudible carrier frequency and a bandwidth, a difference between the first signal and the second signal being an interfering audible signal having an audible frequency based on a difference between the inaudible carrier frequency of the first signal and the inaudible carrier frequency of the second signal being an audible frequency, the interfering audible signal not altering the analog audio content in at least a portion of a frequency range of the analog audio content; and outputting, from the device, the analog audio content within the same device with the first signal and the second signal such that when the analog audio content is detected by a recording device the interfering audible signal is detected with the analog audio content.

25. The method of claim 24, wherein the inaudible carrier frequency of the first signal and the inaudible carrier frequency of the second signal are greater than the at least one audible frequency of the analog audio content.

26. The method of claim 24, wherein the selecting the first signal and the second signal is at a time after the decrypted digital audio content is converted to the analog audio content.

\* \* \* \* \*